(12) United States Patent
Cho

(10) Patent No.: US 11,149,696 B2
(45) Date of Patent: Oct. 19, 2021

(54) GAS TUBE FOR EGR COOLER HAVING IMPROVED ANTI-CORROSIVE CHARACTERISTICS

(71) Applicant: KORENS CO.,LTD., Yangsan-si (KR)

(72) Inventor: Hyung Geun Cho, Busan (KR)

(73) Assignee: KORENS CO., LTD., Yangsan-si (KR)

( * ) Notice: Subject to any disclaimer, the term of this patent is extended or adjusted under 35 U.S.C. 154(b) by 0 days.

(21) Appl. No.: 16/766,795

(22) PCT Filed: Nov. 28, 2017

(86) PCT No.: PCT/KR2017/013695
§ 371 (c)(1),
(2) Date: May 26, 2020

(87) PCT Pub. No.: WO2019/103214
PCT Pub. Date: May 31, 2019

(65) Prior Publication Data
US 2020/0300198 A1  Sep. 24, 2020

(30) Foreign Application Priority Data
Nov. 27, 2017 (KR) .................. 10-2017-0159557

(51) Int. Cl.
*F02M 26/11* (2016.01)
*F02M 26/32* (2016.01)
(Continued)

(52) U.S. Cl.
CPC .............. *F02M 26/11* (2016.02); *B32B 1/08* (2013.01); *B32B 15/016* (2013.01); *C22C 21/02* (2013.01);
(Continued)

(58) Field of Classification Search
CPC .......... F02M 26/11; F02M 26/32; B32B 1/08; B32B 15/016; C22C 21/02; F28F 21/084;
(Continued)

(56) References Cited

U.S. PATENT DOCUMENTS 7,135,239 B2   11/2006  Rajagopalan
8,043,711 B2 * 10/2011  Koshigoe ................ C22C 21/14
                                                        428/457

(Continued)

FOREIGN PATENT DOCUMENTS

JP      10-158769    6/1998
JP       5622349    11/2014
(Continued)

*Primary Examiner* — Joseph J Dallo
*Assistant Examiner* — Kurt Philip Liethen
(74) *Attorney, Agent, or Firm* — Lex IP Meister, PLLC

(57) ABSTRACT

A gas tube for an EGR cooler has such a structure that a metal plate having a flat plate shape is bent in a tube shape. The metal plate includes a core material, a sheath material clad on one surface of the core material or on both surfaces thereof, and an intermediate material clad between the core material and the sheath material so as to prevent magnesium from diffusing from the core material to the sheath material. The core material includes copper (Cu), silicon (Si), iron (Fe), magnesium (Mg), manganese (Mn), titanium (Ti), and aluminum (Al).

3 Claims, 10 Drawing Sheets

(51) Int. Cl.
*B32B 1/08* (2006.01)
*B32B 15/01* (2006.01)
*C22C 21/02* (2006.01)
*F28F 21/08* (2006.01)

(52) U.S. Cl.
CPC .......... *F02M 26/32* (2016.02); *F28F 21/084* (2013.01); *F28F 21/085* (2013.01)

(58) Field of Classification Search
CPC .. F28F 21/085; F28F 2275/04; F28F 2275/12; F28D 9/005; F28D 9/00
See application file for complete search history.

(56) References Cited

U.S. PATENT DOCUMENTS

| | | | | |
|---|---|---|---|---|
| 8,561,451 B2* | 10/2013 | Opferkuch | ............ | F28F 3/046 72/379.6 |
| 8,561,682 B2* | 10/2013 | Ninagawa | ............... | C22C 21/10 165/177 |
| 2005/0161206 A1* | 7/2005 | Ambros | .................. | F28F 9/185 165/173 |
| 2006/0086491 A1* | 4/2006 | Ueda | ....................... | F28F 3/025 165/177 |
| 2008/0274367 A1* | 11/2008 | Kilmer | .................. | B32B 15/016 428/607 |
| 2009/0218085 A1* | 9/2009 | Rogers | .................... | F28F 1/022 165/180 |
| 2010/0051252 A1* | 3/2010 | Ninagawa | ................. | F28F 9/16 165/175 |
| 2013/0220585 A1* | 8/2013 | Oohara | ................. | B23K 1/0012 165/169 |

FOREIGN PATENT DOCUMENTS

| | | |
|---|---|---|
| JP | 6095976 | 3/2017 |
| KR | 10-2013-0079778 | 7/2013 |

* cited by examiner (a)

(b)

(a)

(b)

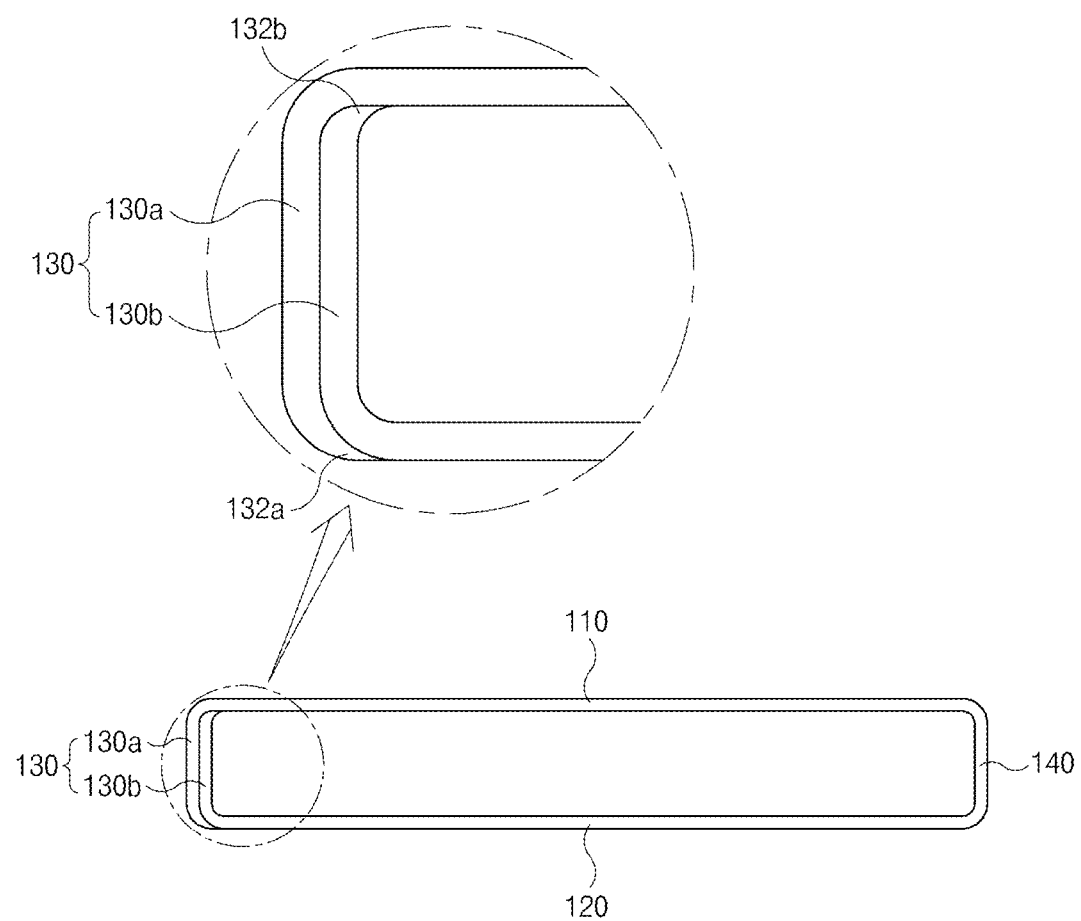

GAS TUBE FOR EGR COOLER HAVING IMPROVED ANTI-CORROSIVE CHARACTERISTICS

TECHNICAL FIELD

The present invention relates to a gas tube included in an exhaust gas recirculation (hereinafter referred to as "EGR") system. More particularly, the present invention relates to a gas tube for an EGR cooler having improved corrosion resistance and strength.

BACKGROUND ART

An exhaust gas recirculation (EGR) system is a system that circulates some exhaust gas back to an intake system to increase the concentration of $CO_2$ in intake air, thereby lowering the temperature in a combustion chamber and thereby reducing $NO_x$ emission.

Meanwhile, the generating mechanism of $NO_x$ will be described in detail. Air contains about 79% nitrogen, 21% oxygen, and other trace elements. Nitrogen and oxygen do not react at room temperature, but do react and form thermal $NO_x$ at high temperatures of about 1450° C. or above. Particularly, a diesel engine performs combustion by compression ignition. A compression ratio of the diesel engine is gradually increased due to development in materials of cylinders, and thus the temperature in a combustion chamber is increased. The increase of the temperature in the combustion chamber improves thermodynamic efficiency of the engine, but a large amount of thermal $NO_x$ is produced due to the high temperature. The thermal $NO_x$ is a major harmful substance destroying the global environment, and causes acid rain, photochemical smog, respiratory diseases, etc.

Principles of a reduction in $NO_x$ emission by the EGR include re-circulating inertia gases (water vapor, carbon dioxide, etc.) to lower maximum temperature in the combustion chamber, performing a lean burn process to prevent a thermal NON-forming atmosphere, and introducing cooling inertia gas having high specific heat to delay ignition advance and to lower local maximum temperature and pressure in the combustion chamber. Meanwhile, a study has reported that the $NO_x$ reduction mechanism by the EGR in diesel engine is caused by a reduction in oxygen concentration, unlike a gasoline engine. On the contrary, a different study has reported that the $NO_x$ reduction mechanism by the EGR in the diesel engine is caused by a reduction in flame temperature. At present, no conclusion has been made to determine which is right, but it has recently been reported that the oxygen concentration and the flame temperature contribute to the $NO_x$ reduction with the same extent.

Regulations on the exhaust gas of the diesel engine have become strict. Accordingly, in order to reduce $NO_x$ without an increase in fuel consumption and particulate matter (PM), an EGR system is equipped with an EGR cooler using an engine coolant, thereby realizing great effect on reduction in $NO_x$ with relatively low cost.

In this case, the EGR cooler has the following requirements: it should be made of a heat-resistant material to cool the exhaust gas temperature of about 700° C. to 150° C.°-200° C.; it should be compact to be installed inside a vehicle; it should have minimum pressure drop to supply an appropriate amount of EGR; it should be made of a corrosion resistant material because condensation is caused by the exhaust gas in a heat-exchange process and condensate contains sulfuric acid due to a sulfur component in fuel, thus leading to corrosion; it should have a predetermined mechanical strength to endure a mechanical load caused by pulsation of the exhaust gas; and it should be provided with means to prevent fouling that may be caused by PM of the exhaust gas, or the like, blocking the inside of a passage.

Hereinafter, an EGR cooler according to the related art will be described in detail with reference to the accompanying drawings.

FIG. 1 is a perspective view showing a conventional EGR cooler, FIG. 2 is a sectional perspective view showing the conventional EGR cooler, and FIG. 3 is a sectional view showing a gas tube included in the conventional EGR cooler.

The EGR cooler generally includes basic components including: a body cell 10 having a coolant inlet pipe 12 and a coolant outlet pipe 14 through which coolant flows in and out; and multiple gas tubes 20 provided inside the body cell 10 and through which an exhaust gas flows. A space in which the coolant may flow is provided between the multiple gas tubes 20. The body cell 10 and the gas tubes 20 are configured to be spaced apart from each other by a predetermined distance so that the coolant flows between the body cell 10 and the gas tubes 20.

As shown in FIG. 2, each of the gas tubes 20 is formed to have a flat surface and a rectangular section. As shown in FIG. 3, the gas tubes 20 are made of a material including a core material 22 which is aluminum alloy and sheath materials 24 clad onto both surfaces of the core material. A3XXX series aluminum alloys, in particular A3003, are widely used as the core material 22, and A4XXX series aluminum alloys, in particular A4045, are widely used as the sheath material 24.

A3003 constituting the core material 22 is excellent in strength and corrosion resistance compared with other series, but tends to be easily corroded by condensate when used as a material of the gas tube for the EGR cooler. In other words, when the exhaust gas containing high concentration of water vapor flows into the gas tubes 20 in use of the EGR cooler, acidic condensate is generated inside the gas tubes 20 when the temperature decreases. Accordingly, the materials of the gas tubes 20 are easily corroded due to negative ions contained in the condensate.

Furthermore, among components of the core material 22, magnesium is an essential component to ensure a certain level of strength. When the sheath materials 24 are directly clad onto both sides of the core material 22, as shown in FIG. 3, magnesium contained in the core material 22 may undesirably pass through the sheath materials 24 and diffuse in a brazing process.

DISCLOSURE

Technical Problem

The present invention has been made to solve the above-mentioned problems and difficulties and relates to a gas tube for an EGR cooler, which has excellent strength and improved corrosion resistance, thus being capable of maintaining a long life even in harsh environments.

Technical Solution

In order to accomplish the above object, the present invention provides a gas tube for an EGR cooler having a structure in which a metal plate having a flat-plate shape is bent in a tube shape, wherein the metal plate may include a core material, a sheath material clad on one surface of the core material or on both surfaces thereof, and an intermediate material clad between the core material and the sheath material so as to prevent magnesium from diffusing from the core material to the sheath material, and the core material may include copper (Cu), silicon (Si), iron (Fe), magnesium (Mg), manganese (Mn), titanium (Ti), and aluminum (Al).

The core material may include 0.4-0.6 wt % of copper (Cu), 0.6 wt %-0.8 wt % of silicon (Si), 0.4 wt %-0.6 wt % of iron (Fe), 0.3 wt %-0.4 wt % of magnesium (Mg), 0.4 wt %-1.1 wt % of manganese (Mn), 0.1 wt %-0.2 wt % of titanium (Ti), and the remainder of aluminum (Al).

The intermediate material may be A3003 aluminum alloy or A0140 aluminum alloy.

The sheath material may be A4045 aluminum alloy.

A total thickness of the metal plate may range from 0.7 to 2.0 mm, a thickness of the sheath material may be 3 to 8% of the total thickness of the metal plate, and a thickness of the intermediate material may be 3 to 8% of the total thickness of the metal plate.

The metal plate may include an upper plate, a lower plate, a downward first side plate extending downwards from a first side of the upper plate in a widthwise direction, an upward first side plate extending upwards from a first side of the lower plate in the widthwise direction and overlapping the downward first side plate, and a second side plate connecting second sides of the upper and lower plates in the widthwise direction to each other, and the downward first side plate and the upward first side plate may be bonded through a brazing process.

The downward first side plate may include a lower bent part overlapping the lower plate, and the upward first side plate may include an upper bent part overlapping the upper plate.

A stair-shaped step may be formed on a lower surface of the first side of the lower plate in the widthwise direction, and the lower bent part may be seated on the stair-shaped step, so that an outer surface of the lower plate and an outer surface of the lower bent part may form one plane.

Each of the lower bent part and the upper bent part may be shaped such that a thickness thereof is reduced towards an end.

Advantageous Effects

A gas tube for an EGR cooler according to the present invention is advantageous in that the gas tube has excellent strength and corrosion resistance such that a long life is maintained even in harsh environments, and the EGR cooler does not undergo performance degradation due to corrosion, thereby reducing exhaust gas and improving fuel efficiency.

Furthermore, a gas tube for an EGR cooler according to the present invention has an advantage in that the bonding portion thereof has no gap or hole formed therein, which may lead to fracture, thereby providing excellent durability and structural strength.

DESCRIPTION OF DRAWINGS

FIG. 16 shows a second embodiment of a coupling structure of the gas tube for the EGR cooler according to the present invention.

MODE FOR INVENTION

Hereinafter, a gas tube for an EGR cooler according to embodiments of the present invention will be described in detail with reference to the accompanying drawings.

The present invention relates to a gas tube 100 mounted on an EGR cooler that exchanges heat between high-temperature exhaust gas and low-temperature coolant to cool the exhaust gas to a certain level and then conveys the exhaust gas to an exhaust gas recirculation (EGR) system. The most important features of the invention are to prevent corrosion resistance and strength from being deteriorated.

Figure 4:
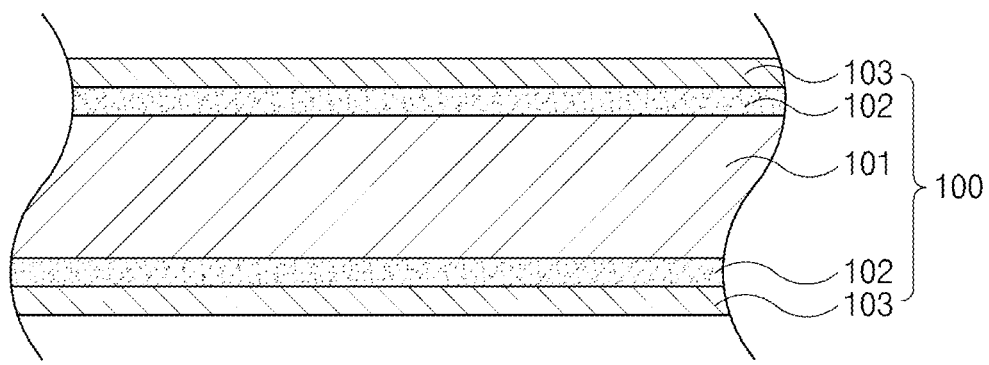
FIG. 4 is a sectional view showing a first embodiment of a gas tube for an EGR cooler according to the present invention.

As illustrated in FIG. 4, the gas tube according to the first embodiment of the present invention includes a core material 101, sheath materials 103 clad onto both sides of the core material 101, and intermediate materials 102 each clad between the core material 101 and the sheath materials 103 to prevent magnesium from diffusing into the sheath materials 103 from the core material 101. The core material 101 includes copper (Cu), silicon (Si), iron (Fe), magnesium (Mg), manganese (Mn), titanium (Ti), and aluminum (Al).

First, the core material 101 serves to maintain main physical properties of a clad material and to impart high strength and high corrosion resistance, and includes copper (Cu), silicon (Si), iron (Fe), magnesium (Mg), manganese (Mn), titanium (Ti), and aluminum (Al). Here, a composition ratio is preferably 0.4 wt %-0.6 wt % of copper (Cu), 0.6 wt %-0.8 wt % of silicon (Si), 0.4 wt %-0.6 wt % of iron (Fe), 0.3 wt %-0.4 wt % of magnesium (Mg), 0.4 wt %-1.1 wt % of manganese (Mn), 0.1 wt %-0.2 wt % of titanium (Ti), and the remainder of aluminum (Al).

That is, the core material 101 according to the present invention is obtained by improving a composition of the conventional A3003 aluminum alloy. As shown in Table 1 below, the core material is increased in the copper content compared with the basic composition of A3003 aluminum alloy to increase the strength and corrosion resistance. In addition, magnesium is added to increase the strength, and titanium is added to induce uniform corrosion.

TABLE 1

Composition of core material 101.

| Category | Composition (wt %) | | | | | | | |
|---|---|---|---|---|---|---|---|---|
| | Cu | Si | Fe | Zn | Mg | Mn | Ti | Al |
| A3003 | 0.05-0.2 | 0.6 | 0.7 | 0.1 | — | 0.1 to 1.5 | — | Rem. |
| Core material 101 of the present invention | 0.4-0.6 | 0.6-0.8 | 0.4-0.6 | — | 0.3-0.4 | 0.4-1.1 | 0.1-0.2 | Rem. |

In more detail, as can be seen in Table 1, the copper content is increased from 0.05 wt %-0.2 wt % to 0.4 wt %-0.6 wt % such that $Al_2Cu$ is precipitated, thereby leading to an increase in strength, and corrosion potential is increased, thereby improving the corrosion resistance. In addition, 0.3 wt %-0.4 wt % of magnesium is added such that $Mg_2Si$ is precipitated, thereby increasing the strength due to age hardening. In addition, 0.1 wt %-0.2 wt % of titanium is added such that the behavior of corrosion is changed, which means that uniform corrosion is induced rather than local corrosion. Furthermore, the iron content is lowered to 0.4 wt %-0.6 wt % according to the present invention because the higher the iron content, the lower the corrosion resistance. Zinc is not contained.

That is, compared with the conventional A3003 aluminum alloy, the core material 101 according to the present invention contains magnesium and titanium, higher copper content, lower iron content, and no zinc, thereby remarkably improving the strength and corrosion resistance.

The sheath materials 103 clad onto both sides of the core material 101 are brazing filler materials provided for brazing. The sheath materials 103 may be A4045 aluminum alloy which is the same as the conventional gas tube material 20, and may be various aluminum alloys disclosed in the related art.

Table 2 below shows a composition of A4045 aluminum alloy.

TABLE 2

Composition of A4045 aluminum alloy.

| Category | Composition (wt %) | | | | | | | |
|---|---|---|---|---|---|---|---|---|
| | Si | Fe | Cu | Mn | Mg | Zn | Ti | Al |
| A4045 | 9.0 to 11.0 | 0.8 | 0.30 | 0.05 | 0.05 | 0.10 | 0.20 | Rem. |

Furthermore, according to the present invention, the intermediate materials 102 are provided to be clad between the core material 101 and the sheath materials 103. The intermediate materials 102 serve to prevent magnesium from diffusing from the core material 101. That is, if magnesium contained in the core material 101 to improve the strength of the core material 101 diffuses into the sheath materials 103, some portions may not be bonded in the brazing process, thereby degrading the bonding capability of the gas tube 100 for the EGR cooler according to the present invention. However, if the intermediate materials 102 for preventing diffusion of magnesium are clad between the core material 101 and the sheath materials 103, magnesium is prevented from diffusing into the sheath materials 103 from the core material 101 and thus non-bonding portions are prevented.

Here, aluminum alloy containing no magnesium, most preferably, A3003 aluminum alloy, may be used as the intermediate materials 102. Since A3003 aluminum alloy has been described in Table 1 above, the description thereof will be omitted here. Alternatively, A0140 aluminum alloy, which contains a small amount of magnesium but prevents magnesium from diffusing from the core material 101, may be used as the intermediate materials 102. A composition of A0140 aluminum alloy is shown in Table 3 below. However, A3003 aluminum alloy is preferably used to most effectively prevent diffusion of magnesium.

TABLE 3

Composition of A0140 aluminum alloy.

| Category | Composition (wt %) | | | | | | | |
|---|---|---|---|---|---|---|---|---|
| | Si | Fe | Cu | Mn | Mg | Zn | Ti | Al |
| A0140 | 0.34 to 0.5 | 0.30 | 0.05 | 0.10 | 0.05 | 0.10 | 0.05 | Rem. |

As described above, since the gas tube 100 for the EGR cooler is composed of the core material 101 having improved corrosion resistance and strength, the intermediate materials 102 preventing magnesium from diffusing from the core material 101, and the sheath materials 103 provided for brazing, the gas tube does not only have excellent strength and corrosion resistance but also has excellent bonding capability. Thus, such a configuration is suitable for the gas tube 100 for the EGR cooler.

In the present invention, the process of manufacturing the gas tube 100 using the above-described materials is performed by methods such as cladding, roll forming, bonding, and the like. Since these methods are well known to those skilled in the art, the detailed description thereof will be omitted.

Meanwhile, the gas tube 100 for the EGR cooler according to the present invention is made by bending a metal plate that is 0.7 mm-2.0 mm thick. This is because when the metal plate is too thin, the heat exchange efficiency is increased but the replacement cycle of the gas tube 100 is shortened which is not good in terms of a cost aspect, and when the metal plate is too thick, the heat exchange efficiency is reduced. Thus, the thickness of the metal plate is preferably set to 0.7 mm-2.0 mm. Preferably, the thickness of the sheath materials 103 is 3%-8% of the total thickness of the metal plate, and the thickness of intermediate materials 102 is likewise 3%-8% of the total thickness of the metal plate. This is because when the thickness of the sheath materials 103 or the intermediate materials 102 is less than 3% of the total thickness, the thickness is too thin and thereby the materials cannot function properly, and when the thickness of the sheath materials or the intermediate materials is more than 8% of the total thickness, it is not good in terms of cost due to the thickness being more than necessary, and the corrosion resistance and strength are adversely affected. Here, the thickness of the sheath materials 103 and the intermediate materials 102 is sum of the thickness of each of the sheath materials 103 and each of the intermediate materials 102 provided on both sides. It is preferable to clad the sheath materials 103 and the intermediate materials 102 to the same thickness on both sides in order to improve the corrosion resistance.

Figure 5:
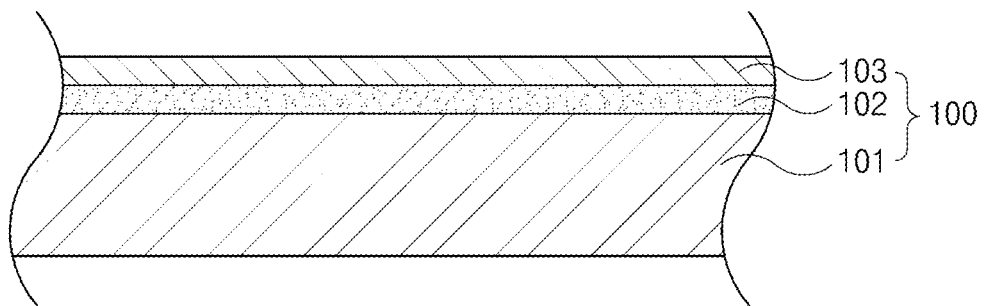
FIG. 5 is a sectional view showing a second embodiment of a gas tube for an EGR cooler according to the present invention.

As shown in FIG. 5, a gas tube according to a second embodiment of the present invention includes a core material 101, a sheath material 103 clad onto a single surface of the core material 101, and an intermediate material 102 clad between the core material 101 and the sheath material 103 to prevent magnesium from diffusing into the sheath material 103 from the core material 101. Furthermore, the core material 101 includes copper (Cu), silicon (Si), iron (Fe), magnesium (Mg), manganese (Mn), titanium (Ti), and aluminum (Al). That is, the intermediate material 102 and the sheath material 103 are clad only onto a single surface of the core material 101. The metal plate having the structure also has remarkably improved corrosion resistance due to the composition of the core material 101.

Here, the metal plate is bent and formed to construct a tube such that the core material 101 corresponds to the inner side of the gas tube 100, and the sheath material 103 corresponds to the outer side of the gas tube 100.

Since the core material 101, the intermediate material 102, and the sheath material 103 have been described above, the description thereof will be omitted.

Hereinafter, the present invention will be described in detail with reference to Examples.

Example 1

First, aluminum alloy was prepared in the composition shown in Table 4 below.

The core material 101 composed of the aluminum alloy was prepared, and the intermediate materials 102 of A3003 aluminum alloy and the sheath materials 103 of A4045 aluminum alloy were clad onto both sides of the core material 101. Here, the core material 101 was 1.5 mm thick, and the intermediate materials 102 and the sheath materials 103 were each 0.075 mm thick. Specifically, the intermediate material 102 on a first side was 0.0375 mm thick, the intermediate material 102 on a second side was 0.0375 mm thick, the sheath material 103 on the first side was 0.0375 mm thick, and the sheath material 103 on the second side was 0.0375 mm thick. The metal plate was bent and formed to prepare the gas tube 100.

TABLE 4

Composition of aluminum alloy of Example 1
Composition (wt %)

| Cu | Si | Fe | Mg | Mn | Ti | Al |
|---|---|---|---|---|---|---|
| 0.5 | 0.7 | 0.5 | 0.3 | 0.7 | 0.15 | Rem. |

Comparative Example 1

Figure 1:
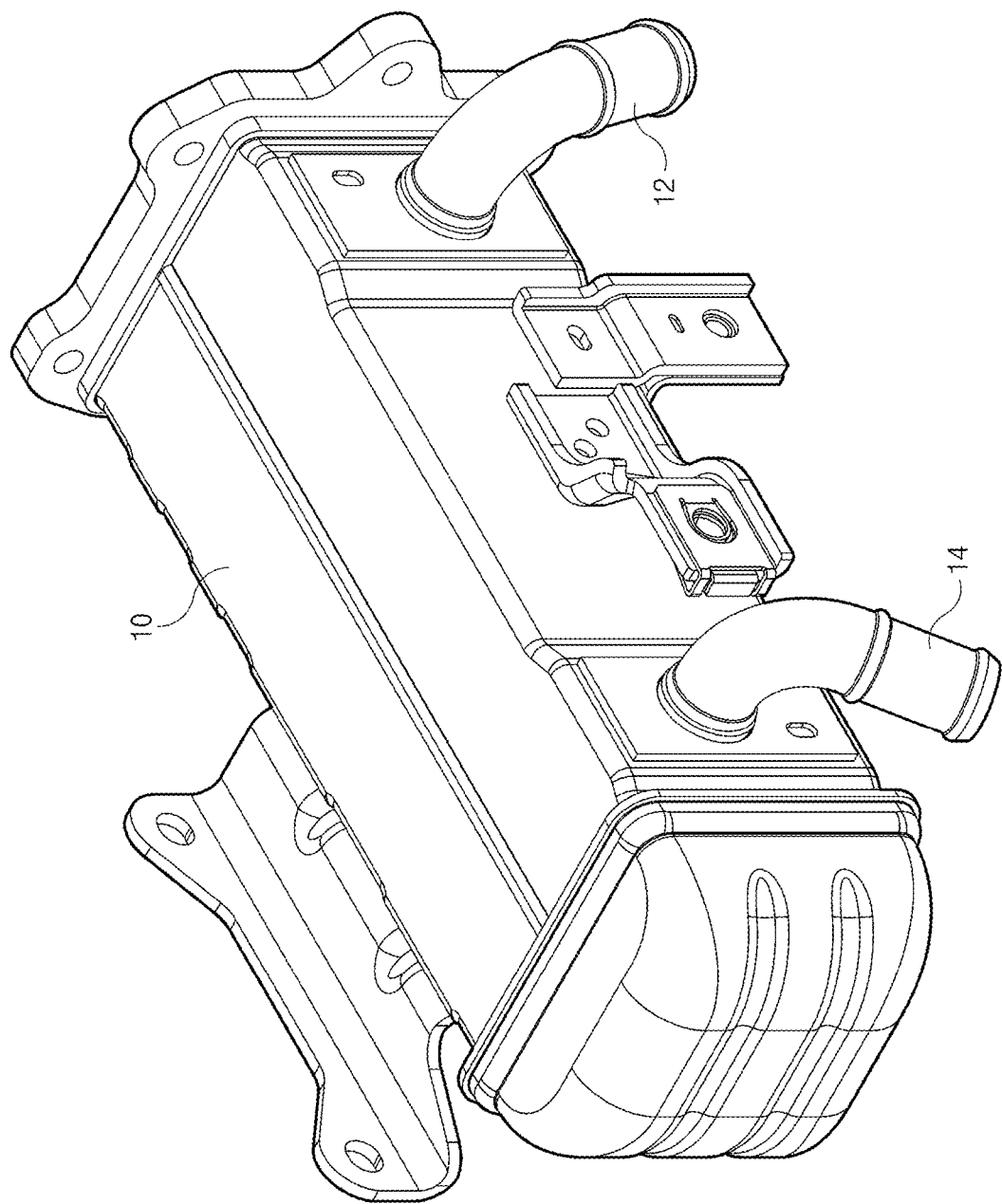
FIG. 1 is a perspective view showing a conventional EGR cooler.
Figure 2:
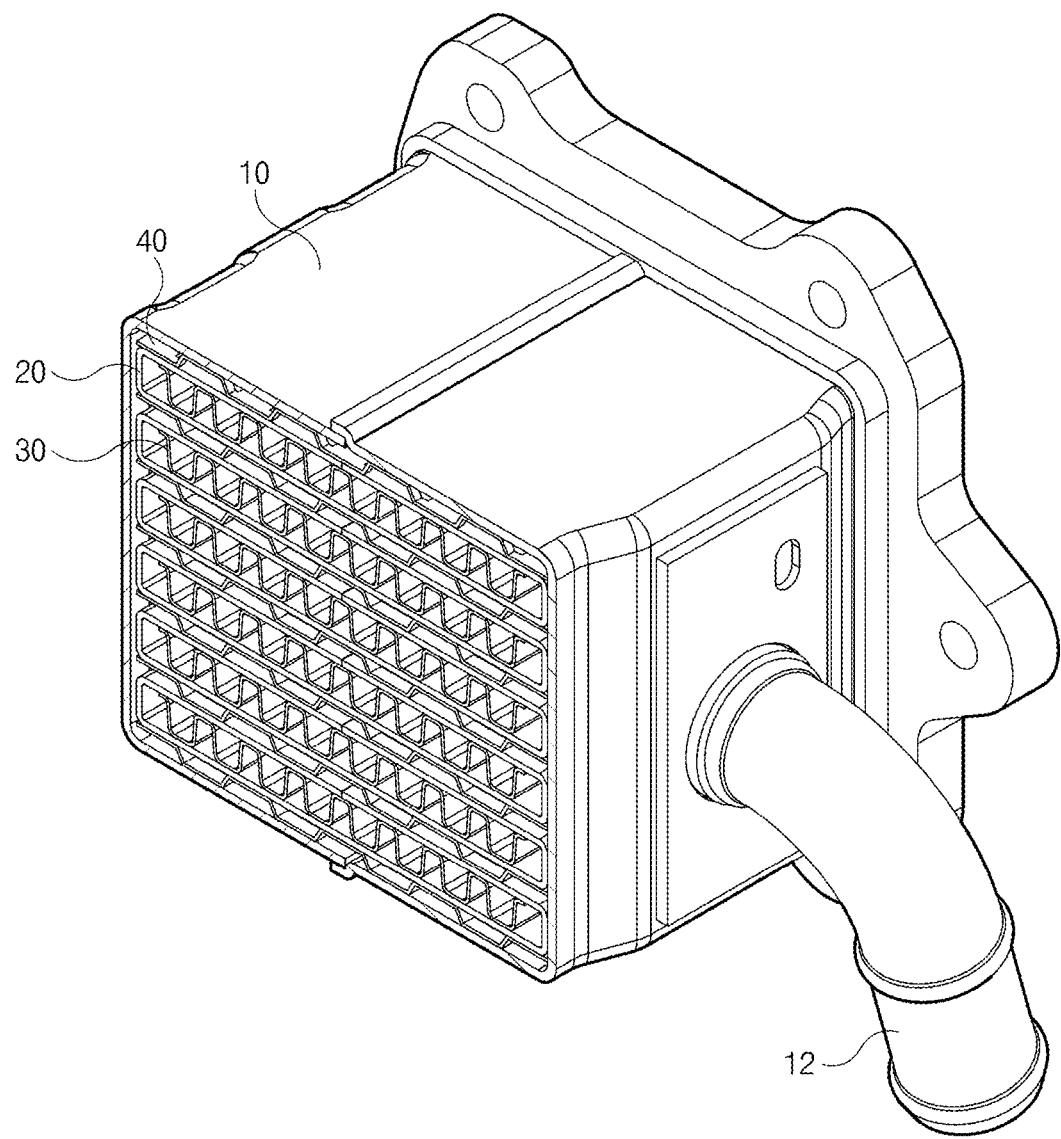
FIG. 2 is a sectional perspective view showing the conventional EGR cooler.
Figure 3:
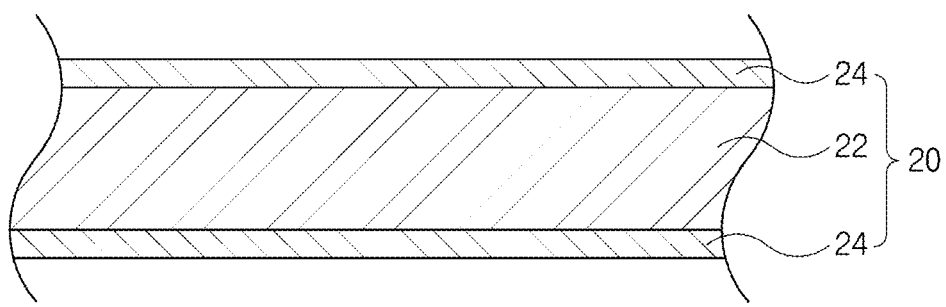
FIG. 3 is a sectional view showing a gas tube for the conventional EGR cooler.

Comparative example 1 relates to the gas tube 20 for the conventional EGR cooler shown in FIG. 3. The sheath materials 24 of A4045 aluminum alloy were clad onto both sides of the core material 22 of A3003 aluminum alloy. Here, the core material 22 was 1.5 mm thick, and each of the sheath materials 24 was 0.0375 mm thick. The metal plate was bent and formed to prepare the gas tube 20.

Test Example 1

A corrosion resistance test for Example 1 and Comparative Example 1 was carried out.

Figure 6:
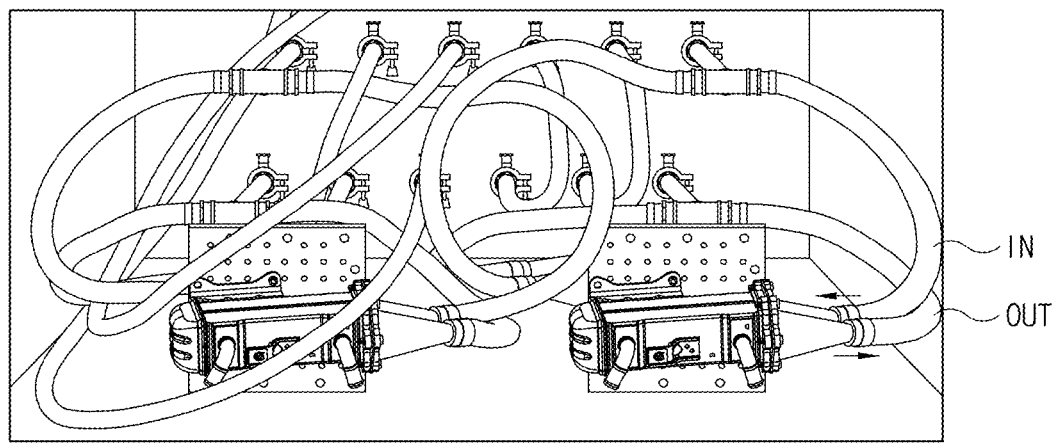
FIG. 6 is a photograph showing a device for testing the gas tube for the EGR cooler according to the present invention.
Figure 7:
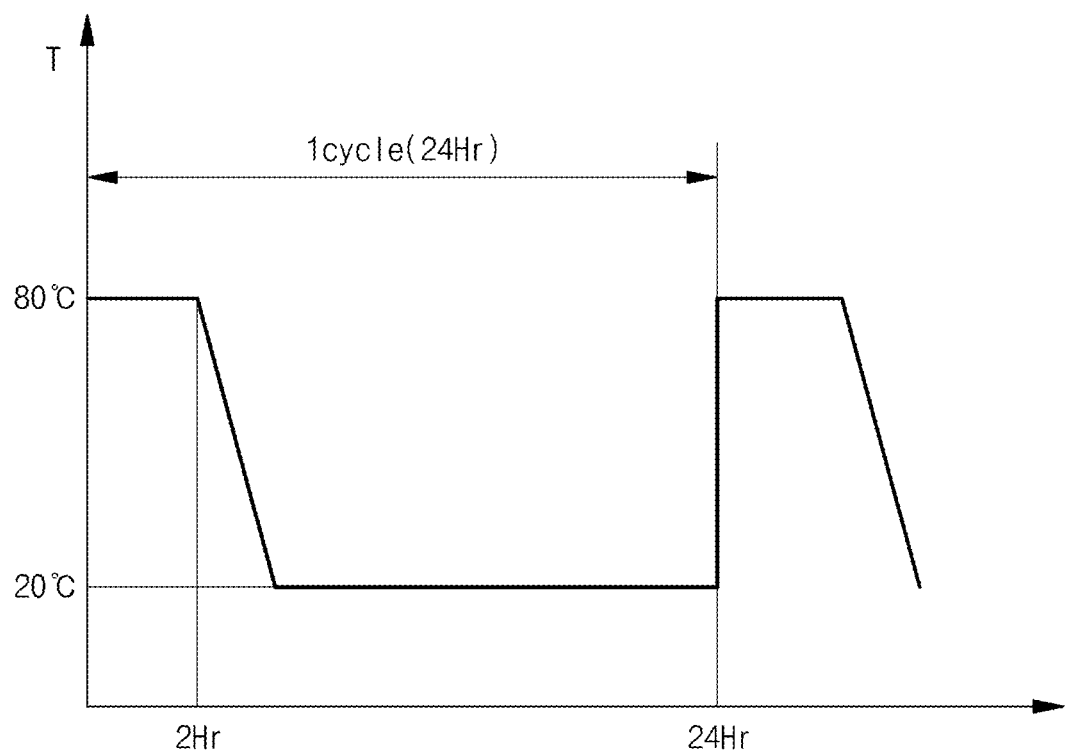
FIG. 7 is a graph showing a condensate circulation cycle when the gas tube for the EGR cooler according to the present invention is tested.

In the corrosion resistance test, condensate having a composition as shown in Table 5 was prepared, and the condensate was circulated through specimens of Example 1 and Comparative example 1 using a device shown in FIG. 6. Here, a circulation cycle of the condensate is shown in FIG. 7, wherein one cycle includes that the condensate of 80° C. was circulated in the specimens of Example 1 and Comparative example 1 for 2 hours and the specimens were left for 22 hours at room temperature. The test was carried out for one week, wherein the cycle was repeated for five days, and the specimens were left for 48 hours at room temperature.

TABLE 5

Composition of condensate.

| Temperature | pH | Composition (ppm) | | | | | |
|---|---|---|---|---|---|---|---|
| | | Cl— | NO$_3$— | SO$_4^2$ | F | CH$_3$COO | HCOO |
| 80° C. | 1.85 | 300 | 2,000 | 400 | 200 | 20,000 | 20,000 |

Figure 8:
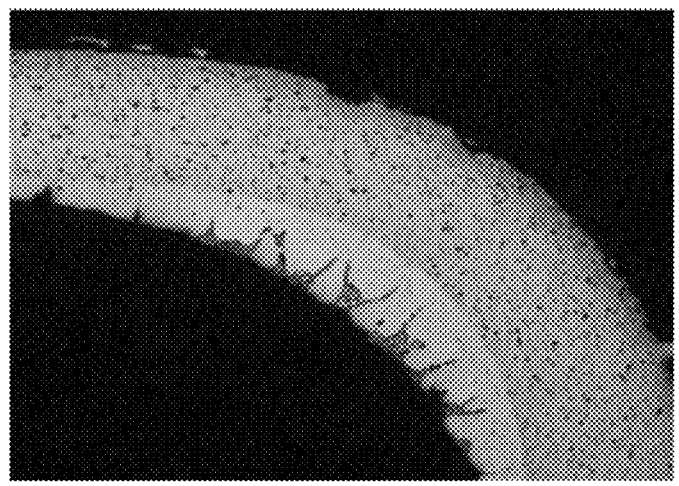
FIG. 8 is a photograph showing a section before and after the conventional gas tube for the EGR cooler is tested.
Figure 8:
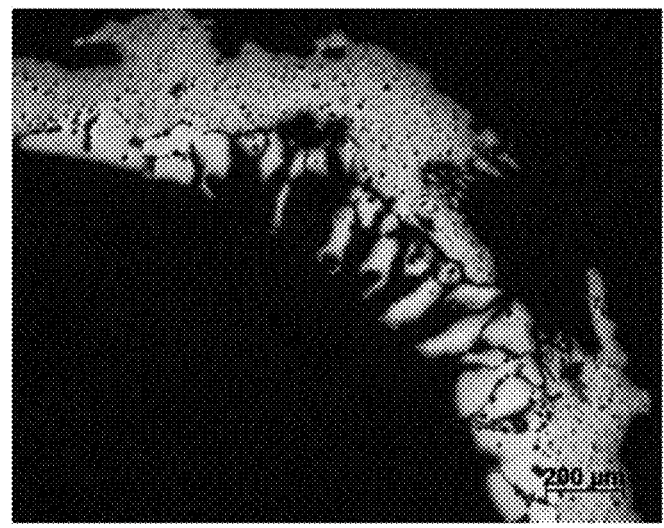
Figure 9:
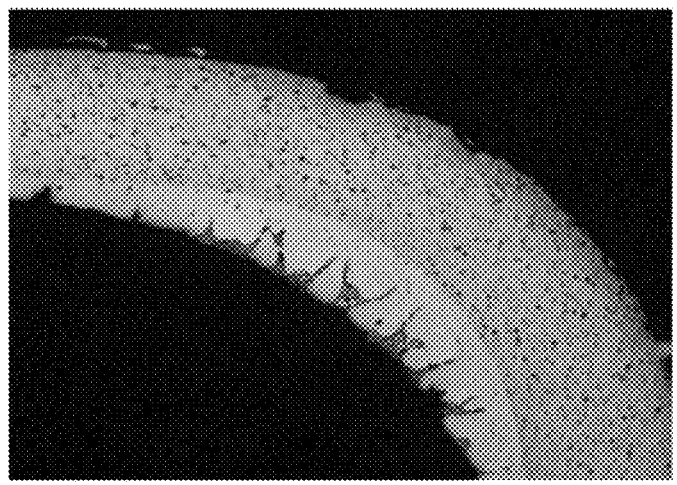
FIG. 9 is a photograph showing a section before and after the gas tube for the EGR cooler according to the present invention is tested.
Figure 9:
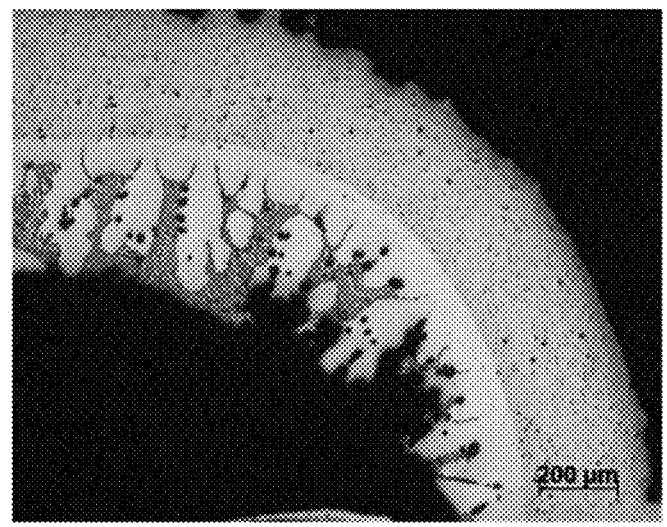

The sections of the specimens were observed to confirm corrosion resistance. FIG. 8(a) is a photograph illustrating the section of Comparative example 1 before carrying out the test, FIG. 8(b) is a photograph illustrating the section of Comparative example 1 after carrying out the test, FIG. 9(a) is a photograph illustrating the section of Example 1 before carrying out the test, and FIG. 9(b) is a photograph illustrating the section of Example 1 after carrying out the test. After the test, corrosion progressed in Comparative example 1 with a narrow and deep shape, and intergranular corrosion also occurred so that it was confirmed that Comparative example 1 was vulnerable in the environment having the condensate. On the contrary, in Example 1 according to the present invention, the progress of corrosion was remarkably less compared with Comparative example 1. In addition, the corrosion did not progress with a narrow and deep shape so that it was confirmed that the risk of penetration of the metal plate was remarkably smaller compared with Comparative example 1.

Therefore, it can be seen that the gas tube 100 for the EGR cooler according to the present invention has high corrosion resistance.

Hereinafter, a process of manufacturing the gas tube 100 for the EGR cooler by bending one metal plate will be described in detail.

Figure 10:
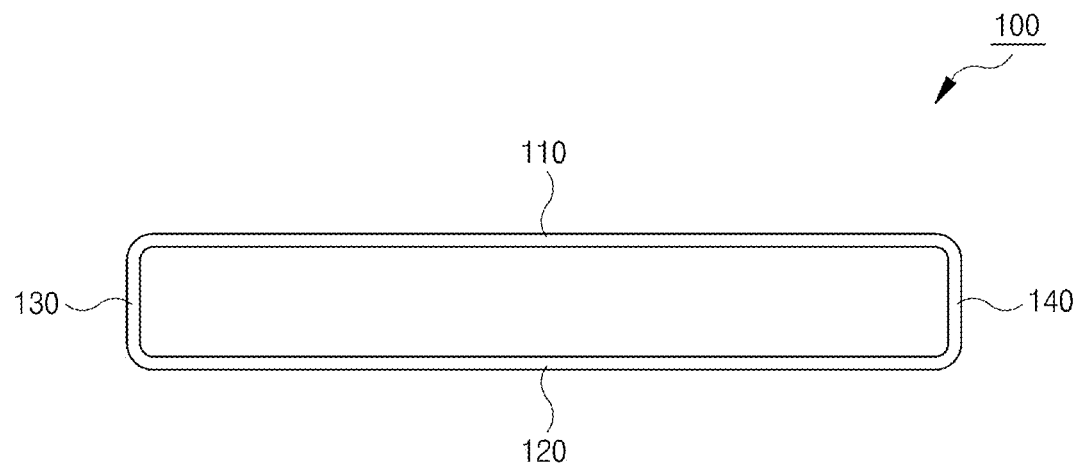
FIG. 10 is a front view showing a coupling structure of the conventional gas tube for the EGR cooler.

Generally, the gas tube 100 for the EGR cooler has the shape of a tube including an upper plate 110, a lower plate 120, a first side plate 130, and a second side plate through a process in which one metal plate is bent and both ends of the metal plate in a widthwise direction are bonded. Here, a portion at which both ends of the metal plate in the widthwise direction are bonded is located in the middle of the lower plate 120 as shown in FIG. 10. The ends are bonded through a laser welding method.

Figure 11:
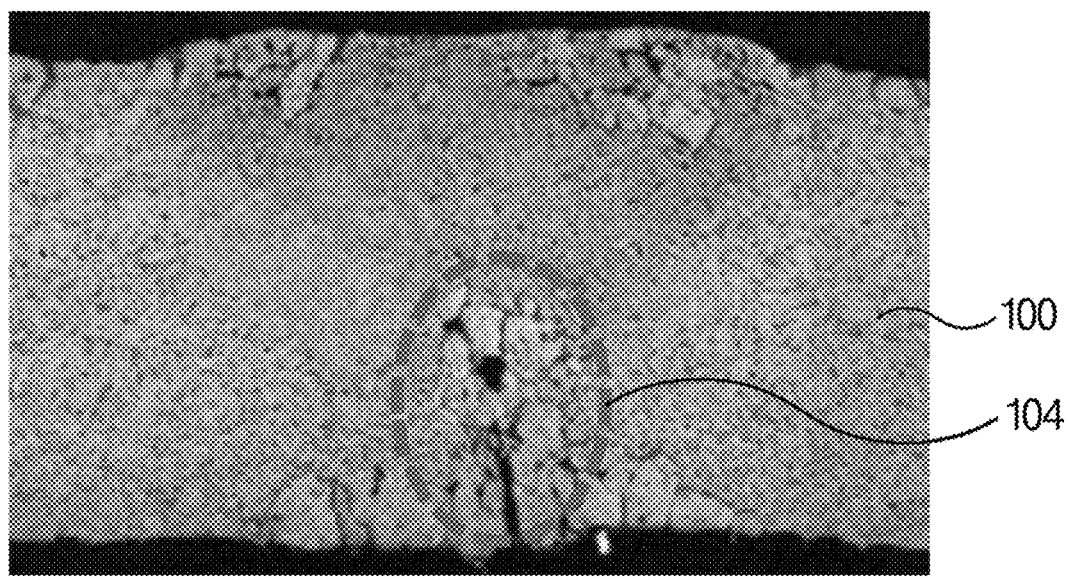
FIGS. 11 to 14 are photographs showing a coupling portion when the gas tube for the EGR cooler according to the present invention is manufactured through a laser welding method.
Figure 12:
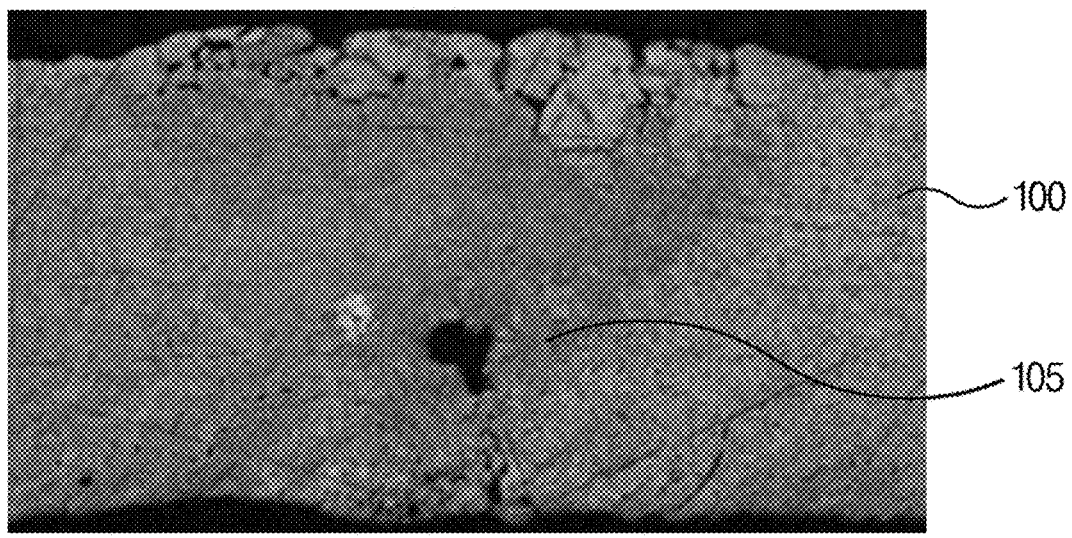

If both ends of the metal plate in the widthwise direction are laser-welded through a butt welding method, thermal deformation may occur in the coupling portion, so that a gap 104 is formed as shown in FIG. 11, or gas generated in the welding process is not discharged, so that a pore 105 is formed in the coupling portion as shown in FIG. 12, thus causing a reduction in strength of the coupling portion.

Figure 13:
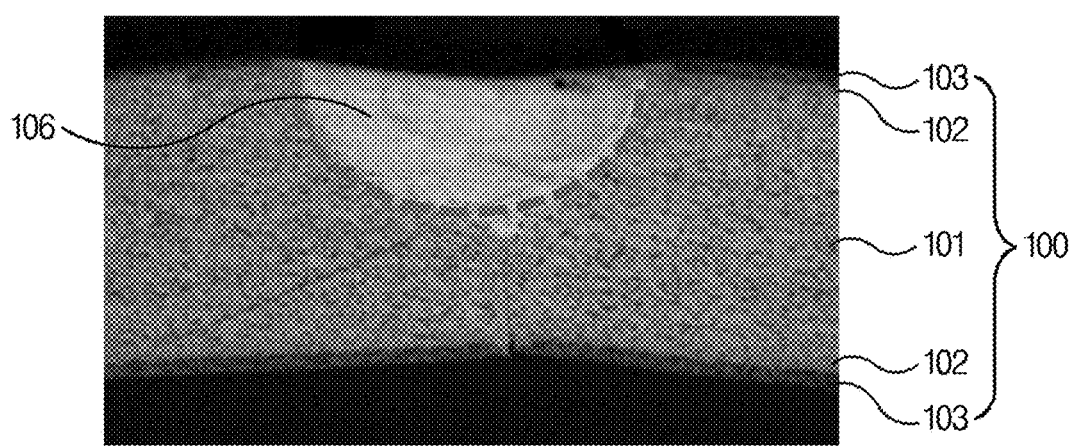
Figure 14:
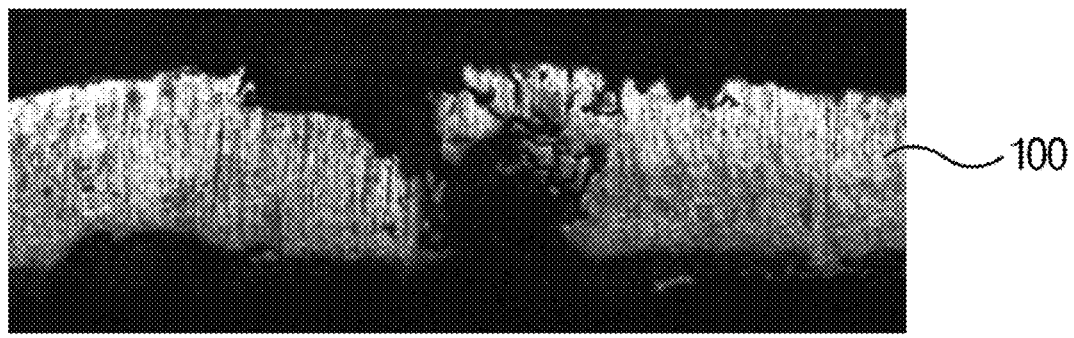

Furthermore, the gas tube 100 for the EGR cooler according to the present invention is characterized in that the intermediate material 102 is clad between the core material 101 and the sheath material 103 so as to prevent magnesium contained in the core material 101 from passing through the sheath material 103 and diffusing. In the case of bonding both ends of the metal plate through the laser welding method, as shown in FIG. 13, a mixed part 106 in which the core material 101, the intermediate material 102, and the sheath material 103 are melted and mixed occurs, so that corrosion may occur at a corresponding portion. If the corrosion occurs at a laser-welded portion as such, as shown in FIG. 14, cracks and through holes are formed in the corresponding portion, thus raising a serious problem where the function of the gas tube 100 is lost.

In order to solve such a problem, the gas tube 100 for the EGR cooler according to the present invention is characterized in that the metal plate is not bonded through the butt welding method, but is bonded in a stacking method through a brazing process.

In other words, the metal plate may include the upper plate 110, the lower plate 120, a downward first side plate 130a extending downwards from a first side (in this embodiment, left side) of the upper plate 110 in the widthwise direction, an upward first side plate 130b extending upwards from a first side (in this embodiment, left side) of the lower plate 120 in the widthwise direction and overlapping the downward first side plate 130a, and a second side plate connecting second sides of the upper and lower plates 110 and 120 in the widthwise direction to each other.

If the first side plate 130 for connecting the first side of the upper plate 110 in the widthwise direction and the first side of the lower plate 120 in the widthwise direction is manufactured in a two-layer stacking structure, the downward first side plate 130a and the upward first side plate 130b may be stacked and then bonded to each other through the brazing process. This is advantageous in that it is possible to prevent the gap 104 or the pore 105 from being formed in the coupling portion, thus eliminating the possibility of damage or fracture. Furthermore, if the downward first side plate 130a and the upward first side plate 130b are brazed through the stacking method, a bonding area of the downward first side plate 130a and the upward first side plate 130b becomes very large, so that the structural strength of the gas tube 100 for the EGR cooler according to the present invention is enhanced.

Figure 15:
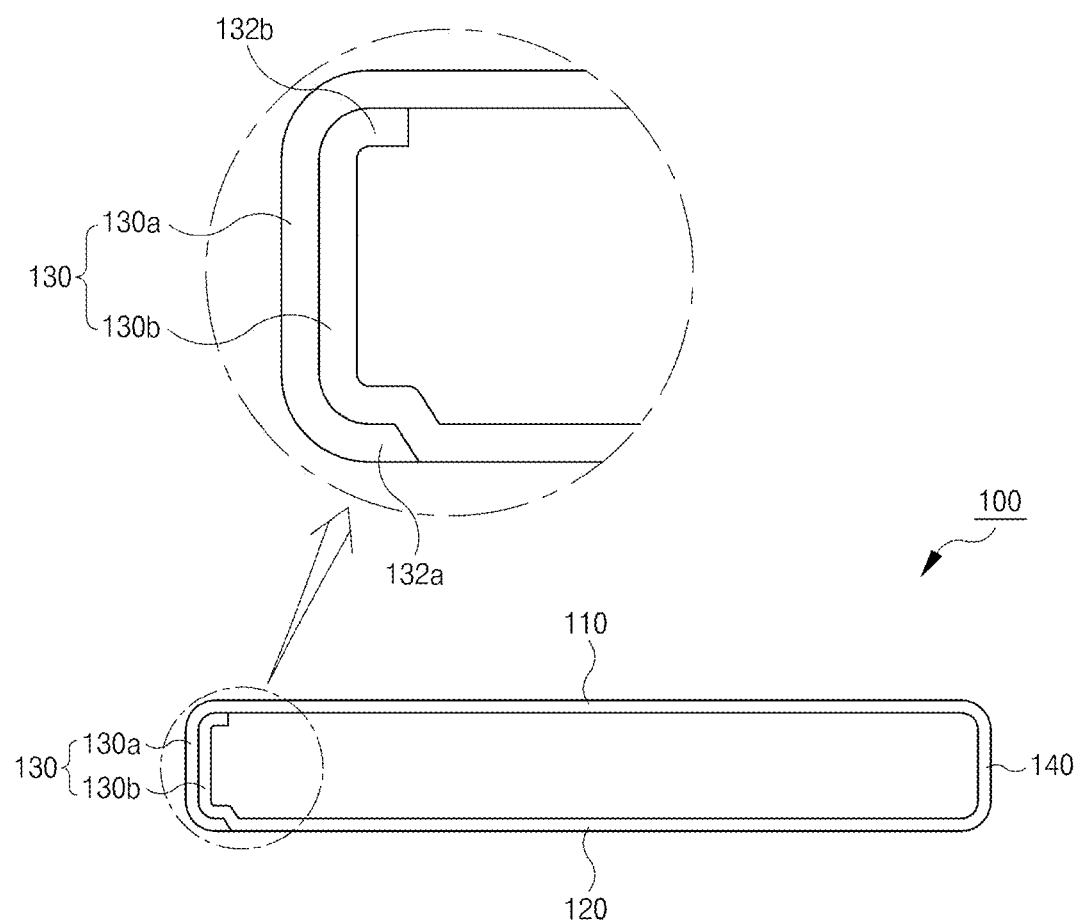
FIG. 15 shows a coupling structure of the gas tube for the EGR cooler according to the present invention.

Meanwhile, in order to prevent the gas tube 100 for the EGR cooler according to the present invention from being easily deformed or broken even if a vertical external force is applied to the gas tube, the downward first side plate 130a and the upward first side plate 130b are preferably made to have very high vertical compressive strength. In other words, as illustrated in FIG. 15, the downward first side plate 130a may include a lower bent part 132a overlapping the lower plate 120, and the upward first side plate 130b may include an upper bent part 132b overlapping the upper plate 110.

As such, if an end of the downward first side plate 130a comes into close contact with the upper surface of the lower plate 120 and an end of the upward first side plate 130b comes into close contact with the lower surface of the upper plate 110, both the downward first side plate 130a and the upward first side plate 130b serve as a bearing wall, so that the structural strength of the gas tube 100 for the EGR cooler is significantly enhanced. Furthermore, since a portion of the gas tube 100 where the lower bent part 132a and the upper bent part 132b are formed is made in two layers, the structural strength of the corresponding portion may also be increased.

Here, if the lower bent part 132a is simply stacked on the lower surface of the lower plate 120, the end of the lower bent part 132a protrudes out. This may raise a problem where coolant passing through an outside of the gas tube 100 for the EGR cooler may collide with the end of the lower bent part 132a, thus generating vortices and providing a poor appearance. Therefore, preferably, a stair-shaped step 112 is formed on a lower surface (in FIG. 15, lower surface of the left side) of the first side of the lower plate 120 in the widthwise direction, and the lower bent part 132a is seated on the stair-shaped step 112.

If the end of the lower bent part 132a is seated on the stair-shaped step 112, an outer surface of the lower plate 120 and an outer surface of the lower bent part 132a form one plane. This structure advantageously has the same good appearance as a structure manufactured through the butt welding method.

Meanwhile, the gas tube 100 according to the present invention may be formed such that each of the lower bent part 132a and the upper bent part 132b is reduced in thickness towards the end thereof, as in the embodiment shown in FIG. 16, thus allowing outer and inner sides to be smoothly made and form one plane. As such, if each of the lower bent part 132a and the upper bent part 132b is formed such that the end thereof is sharp, both of the outer and inner sides may be smoothly made even if a separate step is not formed on the upper plate 110 or the lower plate 120.

While the present invention has been particularly described with reference to exemplary embodiments shown in the drawings, it will be understood by those of ordinary skill in the art that the exemplary embodiments have been described for illustrative purposes, and various changes and modifications may be made without departing from the spirit and scope of the present invention as defined by the appended claims.

The invention claimed is:

1. A gas tube for an EGR cooler having a structure in which a metal plate having a flat-plate shape is bent in a tube shape, wherein the metal plate comprises a core material, a sheath material clad on one surface of the core material or on both surfaces thereof, and an intermediate material clad between the core material and the sheath material so as to prevent magnesium from diffusing from the core material to the sheath material, and the core material consists of 0.4-0.6 wt % of copper (Cu), 0.6 wt %-0.8 wt % of silicon (Si), 0.4 wt %-0.6 wt % of iron (Fe), 0.3 wt %-0.4 wt % of magnesium (Mg), 0.4 wt %-1.1 wt % of manganese (Mn), 0.1 wt %-0.2 wt % of titanium (Ti), and the remainder of aluminum (Al), wherein the intermediate material is A3003 aluminum alloy or A0140 aluminum alloy, and the sheath material is A4045 aluminum alloy wherein the metal plate comprises an upper plate, a lower plate, a downward first side plate extending downwards from a first side of the upper plate in a widthwise direction, an upward first side plate extending upwards from a first side of the lower plate in the widthwise direction and overlapping the downward first side plate, and a second side plate connecting second sides of the upper and lower plates in the widthwise direction to each other, and the downward first side plate and the upward first side plate are bonded through a brazing process, wherein the downward first side plate comprises a lower bent part overlapping the lower plate, and the upward first side plate comprises an upper bent part overlapping the upper plate, and wherein a stair-shaped step is formed on a lower surface of the first side of the lower plate in the widthwise direction, and the lower bent part is seated on the stair-shaped step, so that an outer surface of the lower plate and an outer surface of the lower bent part form one continuous plane without any gap between the outer surface of the lower plate and the outer surface of the lower bent part.

2. The gas tube of claim 1, wherein a total thickness of the metal plate ranges from 0.7 to 2.0 mm, a thickness of the sheath material is 3 to 8% of the total thickness of the metal plate, and a thickness of the intermediate material is 3 to 8% of the total thickness of the metal plate.

3. A gas tube for an EGR cooler having a structure in which a metal plate having a flat-plate shape is bent in a tube shape, wherein the metal plate comprises a core material, a sheath material clad on one surface of the core material or on both surfaces thereof, and an intermediate material clad between the core material and the sheath material so as to prevent magnesium from diffusing from the core material to the sheath material, and the core material consists of 0.4-0.6 wt % of copper (Cu), 0.6 wt %-0.8 wt % of silicon (Si), 0.4 wt %-0.6 wt % of iron (Fe), 0.3 wt %-0.4 wt % of magnesium (Mg), 0.4 wt %-1.1 wt % of manganese (Mn), 0.1 wt %-0.2 wt % of titanium (Ti), and the remainder of aluminum (Al), wherein the intermediate material is A3003 aluminum alloy or A0140 aluminum alloy, and the sheath material is A4045 aluminum alloy wherein the metal plate comprises an upper plate, a lower plate, a downward first side plate extending downwards from a first side of the upper plate in a widthwise direction, an upward first side plate extending upwards from a first side of the lower plate in the widthwise direction and overlapping the downward first side plate, and a second side plate connecting second sides of the upper and lower plates in the widthwise direction to each other, and the downward first side plate and the upward first side plate are bonded through a brazing process, wherein the downward first side plate comprises a lower bent part overlapping the lower plate, and the upward first side plate comprises an upper bent part overlapping the upper plate, and wherein each of the lower bent part and the upper bent part is shaped such that a thickness thereof is reduced towards an end, thereby an outer surface of the lower plate and an outer surface of the lower bent part form one continuous plane without any gap between the outer surface of the lower plate and the outer surface of the lower bent part.

* * * * *